US011475326B2

(12) United States Patent
Cmielowski et al.

(10) Patent No.: US 11,475,326 B2
(45) Date of Patent: Oct. 18, 2022

(54) ANALYZING TEST RESULT FAILURES USING ARTIFICIAL INTELLIGENCE MODELS

(71) Applicant: International Business Machines Corporation, Armonk, NY (US)

(72) Inventors: Lukasz G. Cmielowski, Cracow (PL); Maksymilian Erazmus, Zasów (PL); Rafal Bigaj, Cracow (PL); Wojciech Sobala, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 16/815,952

(22) Filed: Mar. 11, 2020

(65) Prior Publication Data
US 2021/0287109 A1 Sep. 16, 2021

(51) Int. Cl.
G06N 5/04 (2006.01)
G06N 20/00 (2019.01)
G06F 11/36 (2006.01)

(52) U.S. Cl.
CPC ........... G06N 5/04 (2013.01); G06F 11/3692 (2013.01); G06N 20/00 (2019.01)

(58) Field of Classification Search
CPC .... G06F 11/3692; G06N 20/00; G06N 7/023; G06N 5/04
USPC ......................................................... 706/12
See application file for complete search history.

(56) References Cited

U.S. PATENT DOCUMENTS

| 9,710,371 | B2* | 7/2017 | Tosar | G06F 11/3688 |
| 9,946,629 | B2* | 4/2018 | Horesh | G06F 11/3612 |
| 2016/0071017 | A1* | 3/2016 | Adjaoute | G06Q 20/4016 706/52 |
| 2016/0321586 | A1 | 11/2016 | Herzig et al. | |

OTHER PUBLICATIONS

Anonymous, "Automated Software Test Results Analysis Using Archived Results," IP.com, IPCOM000231145D, Sep. 30, 2013, pp. 1-2.

* cited by examiner

Primary Examiner — John Q Chavis
(74) Attorney, Agent, or Firm — Robert A. Voight, Jr.; Shackelford, Bowen, McKinley & Norton, LLP

(57) ABSTRACT

A computer-implemented method, system and computer program product for analyzing test result failures using artificial intelligence models. A first machine learning model is trained to differentiate between a bug failure and a test failure within the test failures based on the failure attributes and historical failures. The failure type for each failed test in test failure groups is then determined using the first machine learning model. The failed tests in the test failure groups are then clustered into a set of clusters according to the failure attributes and the determined failure type for each failed test. A root cause failure for each cluster is identified based on the set of clusters and the failure attributes. The root cause of an unclassified failure is predicted using a second machine learning model trained to predict a root cause of the unclassified failure based on identifying the root cause failure for each cluster.

20 Claims, 4 Drawing Sheets

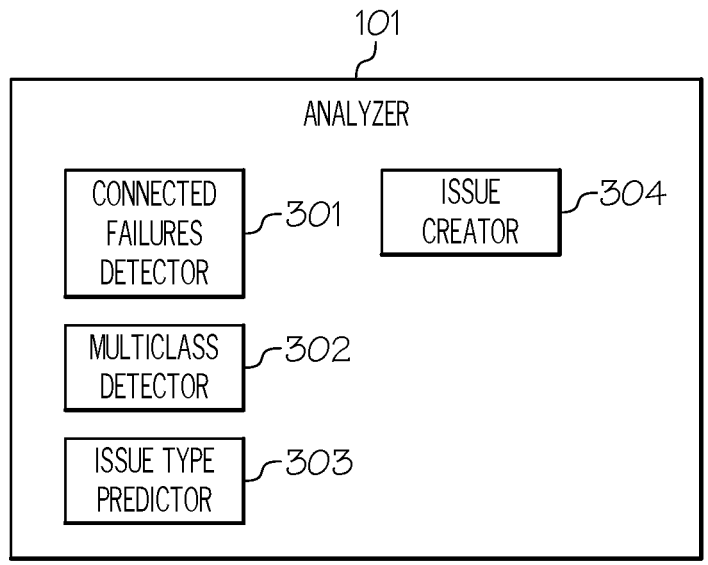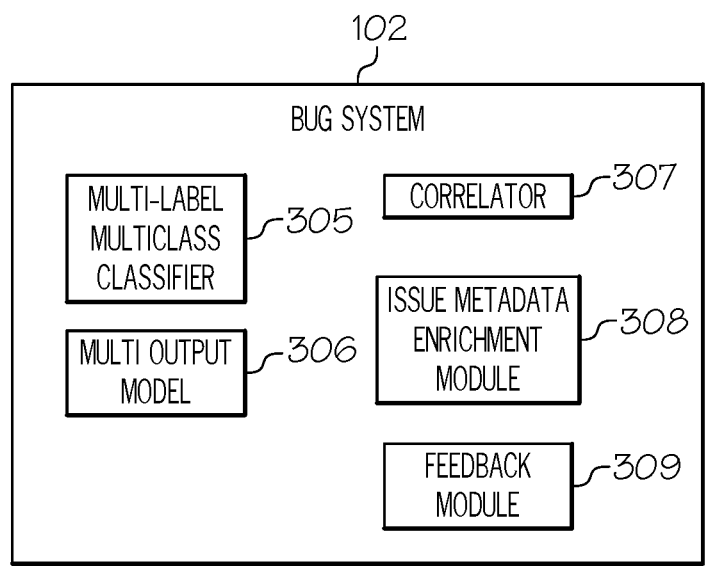
FIG. 3

ANALYZING TEST RESULT FAILURES USING ARTIFICIAL INTELLIGENCE MODELS

TECHNICAL FIELD

The present invention relates generally to software testing, and more particularly to analyzing test result failures using artificial intelligence models.

BACKGROUND

In software testing, test automation is the use of software, such as in a test suite (referred to herein as the "automated test suite"), separate from the software being tested to control the execution of tests and the comparison of actual outcomes with predicted outcomes. Test automation can automate some repetitive but necessary tasks in a formalized testing process already in place, or perform additional testing that would be difficult to do manually. Test automation is critical for continuous delivery and continuous testing.

SUMMARY

In one embodiment of the present invention, a computer-implemented method for analyzing test result failures using artificial intelligence models comprises grouping a set of test failures within a plurality of test results into one or more sets of test failure groups according to a set of failure attributes. The method further comprises training a first machine learning model to differentiate between a bug failure and a test failure within the set of test failures based on the set of failure attributes and a set of historical failures. The method additionally comprises determining a failure type for each failed test in the one or more sets of test failure groups using the first machine learning model. Furthermore, the method comprises clustering the failed tests in the one or more sets of test failure groups into a set of clusters according to the set of failure attributes and the determined failure type for each failed test. Additionally, the method comprises identifying a root cause failure for each cluster based on the set of clusters and the set of failure attributes. In addition, the method comprises training a second machine learning model to predict a root cause of an unclassified failure based on identifying the root cause failure for each cluster. The method further comprises predicting the root cause of the unclassified failure using the second machine learning model.

Other forms of the embodiment of the computer-implemented method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 3 illustrates the software components of the analyzer and the bug system used for analyzing the test result failures using artificial intelligence models in accordance with an embodiment of the present invention.

DETAILED DESCRIPTION

Figure 1:
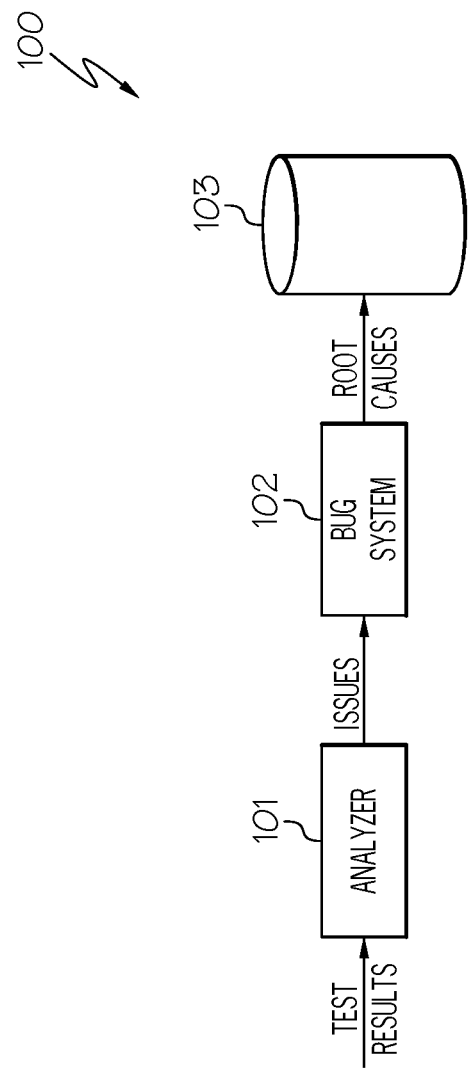
FIG. 1 illustrates a communication system for practicing the principles of the present invention in accordance with an embodiment of the present invention.

As stated in the Background section, in software testing, test automation is the use of software, such as in a test suite (referred to herein as the "automated test suite"), separate from the software being tested to control the execution of tests and the comparison of actual outcomes with predicted outcomes. Test automation can automate some repetitive but necessary, or useful, tasks in a formalized testing process already in place, or perform additional testing that would be difficult to do manually. Test automation is critical for continuous delivery and continuous testing.

The automated test suite may be executed multiple times, including in different software testing environments. As a result, there may be hundreds of tests with numerous failed test cases to analyze. A "test case," as used herein, describes a test that needs to be run on the program to verify that the program runs as expected. A "failed test case," as used herein, refers to a test case that fails to verify that the program runs as expected.

Typically, the failed test cases are analyzed manually by the software developer to determine the cause of the failure, such as a result of a "bug" in the software (a software bug is an error, flaw or fault in a computer program or system that causes it to produce an incorrect or unexpected result, or to behave in unintended ways), a bug in the test (a test bug is an error, flaw or fault in the test to be run on the program to verify that the program runs as expected) or an environment issue.

After analyzing the failed test case, the issue or problem concerning the failed test case is categorized by setting the appropriate severity rating and assigning the failed test case to the appropriate team or component to address or handle. For example, a problem description regarding the failed test case may be written by subject matter experts which is then provided to the appropriate team to address.

Such a process in evaluating failed test cases by determining the cause of such failures and identifying the appropriate team or component for solving the problem is very time consuming and overwhelming, even for experienced software engineers.

The embodiments of the present disclosure provide a means for analyzing failed test cases using artificial intelligence models to determine the cause of such failures and identify the appropriate team or component for solving the problem.

In some embodiments, the present disclosure comprises a computer-implemented method, system and computer program product for analyzing test result failures using artificial intelligence models. In one embodiment of the present disclosure, a set of test failures (within the test results) is grouped into one or more sets of test failure groups according to a set of failure attributes. A "failure group," as used herein, refers to a group of failures with similar failure attributes. "Failure attributes," as used herein, refer to the attributes or features of test reports and the reported historical issues that are linked to historical test reports. For example, such failure attributes may include the test suite execution summary, test case name, environment name, execution date and time, execution duration, test suite name, test case description, test case order number, test case execution log, test case execution error message and test case execution stack trace. Furthermore, a first machine learning model (artificial intelligence model) is trained to differentiate between a bug failure and a test failure within the set of test failures based on the set of failure attributes and a set of historical failures. The failure type (e.g., bug failure, test failure) for each failed test in the one or more sets of test failure groups is then determined using the first machine learning model. The failed tests in the one or more sets of test failure groups are clustered into a set of clusters according to the set of failure attributes and the determined failure type for each failed test. A root cause failure for each cluster is identified based on the set of clusters and the set of failure attributes. A "root cause failure," as used herein, refers to the initiating cause of either a condition or a causal chain that leads to an outcome or effect of interest. That is, the root cause is a cause (harmful factor) that is root (deep, basic, fundamental, underlying, initial or the like). A second machine learning model (artificial intelligence model) is then trained to predict a root cause of an unclassified failure based on identifying the root cause failure for each cluster. The root cause of the unclassified failure is then predicted using the second machine learning model. In this manner, the analysis of failed test cases, including determining the cause of such test failures, may be performed in a more efficient and accurate manner.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates a communication system 100 for analyzing the test results using a pipeline of machine learning models (artificial intelligence models) and submitting the corresponding issue to a bug system in accordance with an embodiment of the present disclosure.

Communication system 100 includes an analyzer 101 that uses a machine learning model (artificial intelligence model) to analyze incoming test results. A "test result," as used herein, refers to a report on how successful the test case was in running a test on a program to verify that the program ran as expected. Analyzer 101 may identify the failed test cases, including the type of failure, (referred to as "issues") which are sent to a bug system 102 for determining the cause of the failure using a machine learning model (artificial intelligence model). The determined root causes are then stored in a database 103 connected to bug system 102. Furthermore, in one embodiment, database 103 stores the reported issues (become the historical issues) along with the corresponding test reports. A discussion regarding the hardware configuration of analyzer 101 and bug system 102 is provided below in connection with FIG. 2.

While FIG. 1 illustrates separate devices (analyzer 101, bug system 102) for analyzing test result failures using artificial intelligence models, the principles of the present disclosure include such modifications whereby the analysis of the test result failures using artificial intelligence models may be performed by a single unit as opposed to the two separate devices as shown in FIG. 1.

Figure 2:
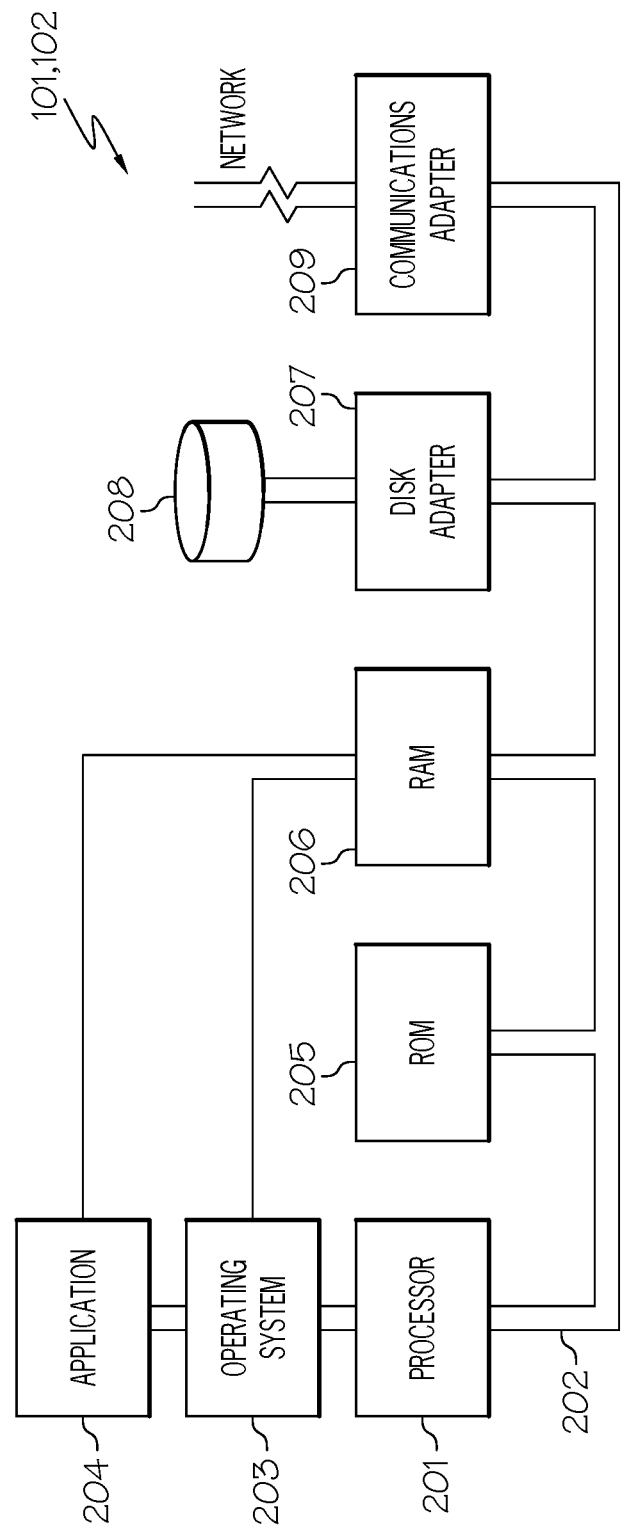
FIG. 2 illustrates an embodiment of the present invention of a hardware configuration of the analyzer and the bug system.

Referring now to FIG. 2, FIG. 2 illustrates an embodiment of the present disclosure of the hardware configuration of analyzer 101 (FIG. 1) and bug system 102 (FIG. 1) which is representative of a hardware environment for practicing the present disclosure.

Analyzer 101 and bug system 102 have a processor 201 connected to various other components by system bus 202. An operating system 203 runs on processor 201 and provides control and coordinates the functions of the various components of FIG. 2. An application 204 in accordance with the principles of the present disclosure runs in conjunction with operating system 203 and provides calls to operating system 203 where the calls implement the various functions or services to be performed by application 204. Application 204 may include, for example, a program for analyzing test result failures using artificial intelligence models to determine the cause of the failures and identify the appropriate team or component for solving the problem as discussed further below in connection with FIGS. 3-4.

Referring again to FIG. 2, read-only memory ("ROM") 205 is connected to system bus 202 and includes a basic input/output system ("BIOS") that controls certain basic functions of analyzer 101, bug system 102. Random access memory ("RAM") 206 and disk adapter 207 are also connected to system bus 202. It should be noted that software components including operating system 203 and application 204 may be loaded into RAM 206, which may be analyzer's 101, bug system's 102 main memory for execution. Disk adapter 207 may be an integrated drive electronics ("IDE") adapter that communicates with a disk unit 208, e.g., disk drive. It is noted that the program for analyzing test result failures using artificial intelligence models to determine the cause of the failures and identify the appropriate team or component for solving the problem, as discussed further below in connection with FIGS. 3-4, may reside in disk unit 208 or in application 204.

Analyzer 101 and bug system 102 may further include a communications adapter 209 connected to bus 202. Communications adapter 209 interconnects bus 202 with an outside network to communicate with other devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, typically, the failed test cases are analyzed manually by the software developer to determine the cause of the failure, such as a result of a "bug" in the software (a software bug is an error, flaw or fault in a computer program or system that causes it to produce an incorrect or unexpected result, or to behave in unintended ways), a bug in the test (a test bug is an error, flaw or fault in the test to be run on the program to verify that the program runs as expected) or an environment issue. After analyzing the failed test case, the issue or problem concerning the failed test case is categorized by setting the appropriate severity rating and assigning the failed test case to the appropriate team or component to address or handle. For example, a problem description regarding the failed test case may be written by subject matter experts which is then provided to the appropriate team to address. Such a process in evaluating failed test cases by determining the cause of such failures and identifying the appropriate team or component for solving the problem can be time consuming and overwhelming, even for experienced software engineers.

Figure 4:
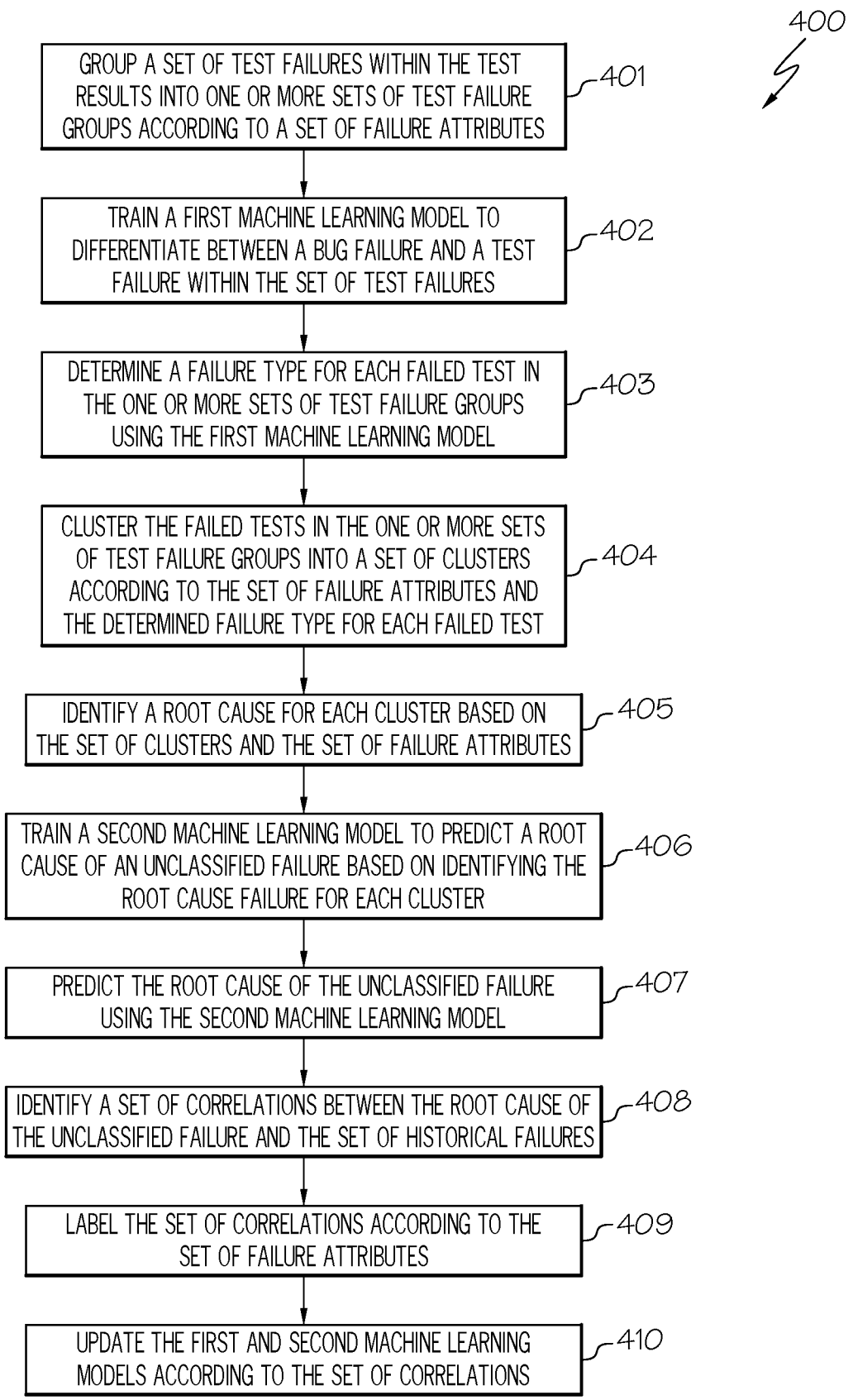
FIG. 4 is a flowchart of a method for analyzing the test result failures using artificial intelligence models in accordance with an embodiment of the present invention.

The embodiments of the present disclosure provide a means for analyzing failed test cases using artificial intelligence models to determine the cause of such failures and identify the appropriate team or component for solving the problem as discussed below in connection with FIGS. 3-4. FIG. 3 illustrates the software components of the analyzer and the bug system used for analyzing the test result failures using artificial intelligence models. FIG. 4 is a flowchart of a method for analyzing the test result failures using artificial intelligence models.

As stated above, FIG. 3 illustrates the software components of analyzer 101 (FIG. 1) and bug system 102 (FIG. 1) used for analyzing the test result failures using artificial intelligence models in accordance with an embodiment of the present disclosure. In one embodiment, such components reside within application 204 of analyzer 101, bug system 102.

Referring to FIG. 3, in conjunction with FIGS. 1 and 2, in one embodiment, the software components of analyzer 101 include a connected failures detector 301 configured to group a set of test failures within the test results into one or more sets of test failure groups according to a set of failure attributes. In one embodiment, connected failures detector 301 uses unsupervised clustering algorithm(s) to group the set of test failures into one or more sets of failure groups. An unsupervised clustering algorithm, as used herein, refers to a type of self-organized Hebbian learning that helps find previously unknown patterns in the data set (failure attributes) without pre-existing labels. Examples include the K-means clustering algorithm and the Fuzzy c-means clustering algorithm. Furthermore, "the one or more sets of test failure groups," as used herein, are groups of test failures with similar failure attributes. "Failure attributes," as used herein, refer to the attributes or features of test reports and the reported historical issues that are linked to historical test reports. For example, such failure attributes may include the test suite execution summary, test case name, environment name, execution date and time, execution duration, test suite name, test case description, test case order number, test case execution log, test case execution error message and test case execution stack trace. "Reported historical issues," as used herein, refer to the issues reported to bug system 102. Such issues may be linked to a test report. In one embodiment, the reported historical issues along with the corresponding test reports may be stored in database 103 connected to bug system 102.

Analyzer 101 further includes the software component of the multiclass detector 302. In one embodiment, multiclass detector 302 identifies the failure type. A multiclass or multinomial classification is the problem of classifying instances into one of three or more classes.

In one embodiment, multiclass detector 302 identifies three difference classes of failures, such as software, test and environment. A software failure corresponds to the bug failure discussed above. A test failure is discussed above. An environment corresponds to the support of an application, such as the operating system, the database system, development tools, compiler, etc. An environment failure corresponds to a failure in such an environment, such as a failure in utilizing the development tools.

In one embodiment, multiclass detector 302 trains a first machine learning model (artificial intelligence model) to predict the issue type (e.g., bug failure, test failure) for the failed test cases. A machine learning model is a mathematical model built by a machine learning algorithm based on sample data, known as "training data," in order to make predictions or decisions without being explicitly programmed to perform the task. In one embodiment, the training data consists of failure attributes and historical failures.

In one embodiment, the first machine learning model corresponds to a classification model trained to predict the issue type (e.g., bug failure, test failure) for the failed test cases. In one embodiment, such a machine learning model is trained based on failure attributes and historical failures, such as test case information, test suite execution summary, test case name, environment name, execution data and time, execution duration, test suite name, test case description, test case execution log, test case execution error message, and test case execution stack trace.

In one embodiment, particular target information is extracted and labeled from historical issues reported by subject matter experts. In one embodiment, each issue is labeled by adding the appropriate tag value or field value, such as bug, text, and environment, to correspond to a bug, test and environment failure, respectively.

In one embodiment, a binary classifier may be utilized as opposed to a multiclass classifier in which the binary classifier is used for predicting one of the two classes ("bug," "test"). In one embodiment, in such a classification, the target variable values may be easier to extract in comparison to utilizing the multiclass classifier. For example, by using the binary classifier, it may be assumed that all issues reported as bugs in bug system 102 and not marked as invalid are in fact labeled "bug." Similarly, failed test cases that do not have corresponding issues opened in the system can be labeled as "test."

In one embodiment, the trained classifier is applied to each failed test case and the prediction (e.g., type of failure, such as a bug failure or a test failure) is returned.

Analyzer 101 additionally includes an issue type predictor 303 configured to determine the failure type (e.g., bug failure, test failure) for each failed test in the failure groups using the first machine learning model.

In one embodiment, issue type predictor 303 is configured to support correct predictions made by multiclass detector 302. In one embodiment, issue type predictor 303 is based on unsupervised learning techniques, in which no target is needed in such a case. An unsupervised learning technique corresponds to a type of machine learning algorithm used to draw inferences from datasets consisting of input data without labeled responses. For example, one such unsupervised learning technique corresponds to cluster analysis, which is used for exploratory data analysis to find hidden patterns or grouping in data.

In one embodiment, collaborative filtering techniques or correlation matrices can be used to find similar failed test cases already reported as issues in the system. Collaborative filtering is a process of filtering for information or patterns using techniques involving collaboration among multiple data sources (e.g., sets of failure groups, set of historical failures). A correlation matrix is a table showing correlation coefficients between variables. A correlation matrix is used to summarize data (e.g., sets of failure groups, set of historical failures) as an input into a more advanced analysis, and as a diagnostic for advanced analysis.

Furthermore, analyzer 101 includes issue creator 304 configured to cluster the failed tests in the one or more sets of test failure groups into a set of clusters according to the set of failure attributes and the determined failure for each failed test. In one embodiment, issue creator 304 also clusters the failed tests in the set of historical failures into the set of clusters according to the set of failure attributes.

"Clustering," as used herein, refers to a machine learning technique that involves the grouping of data points (e.g., failure type, failure attributes). Given a set of data points, a clustering algorithm is used to classify each data point into a specific group (e.g., set of clusters). In one embodiment, such clustering algorithms include centroid-based clustering, density-based clustering, distribution-based clustering, and hierarchical clustering.

Furthermore, in one embodiment, information enclosed under the issue can be used to determine the failure type for the currently analyzed failed test case.

In one embodiment, issue creator 304 creates a number of issues (e.g., one to two issues) depending on the cluster size. The greater the cluster size, the greater the number of issues is created. In one embodiment, the remaining failed test cases within the cluster that were classified as bug are referenced in those issues.

In one embodiment, the first issue is created based on the cluster centroid. The second issue would then represent the most outer cluster elements.

In one embodiment, the cluster can be split into two sections (e.g., inner and outer circle) depending on the distance to the centroid. As a result of such an approach, duplicated issues will not be created.

In one embodiment, depending on the feedback, the cluster size and number of clusters can be tuned.

Bug system 102, on the other hand, includes the software component of multi-label multiclass classifier 305. Multi-label multiclass classifier 305 identifies, based on the set of clusters and the set of failure attributes, a root cause failure for each cluster. In one embodiment, a root cause analysis is performed to identify the root cause of the failure or problem for each cluster. In one embodiment, the root cause analysis identifies and describes the failure or problem from the set of clusters; establishes a timeline from the normal situation up to the time the failure or problem occurred; distinguishes between the root cause and other causal factor (e.g., using event correlation); and establishes a causal graph between the root cause and the problem. Such a causal graph is then analyzed to determine whether there is an association between the failure attribute (problem) and the root cause. A "root cause failure," as used herein, refers to the initiating cause of either a condition or a causal chain that leads to an outcome or effect of interest. That is, the root cause is a cause (harmful factor) that is root (deep, basic, fundamental, underlying, initial or the like).

In one embodiment, multi-label multiclass classifier 305 implements the root cause analysis using machine learning classification and clustering algorithms. Examples of such algorithms include linear classifiers, nearest neighbor, support vector machines, decision trees, boosted trees, random forest, neural networks, K-means clustering algorithms, Fuzzy c-means clustering algorithms, Gaussian clustering algorithms, centroid-based clustering algorithms, density-based clustering algorithms, distribution-based clustering algorithms, hierarchical clustering algorithms, etc.

Furthermore, multi-label multiclass classifier 305 trains a second machine learning model (artificial intelligence model) to predict the root cause of an unclassified failure based on identifying a root cause failure for each cluster.

As discussed above, a machine learning model is a mathematical model built by a machine learning algorithm based on sample data, known as "training data," in order to make predictions or decisions without being explicitly programmed to perform the task. In one embodiment, the training data consists of the identified root cause failures for each cluster. Based on identifying the failure attributes classified for the cluster, the machine learning model is able to predict the root cause failure for an unclassified failure based on the failure attributes of the unclassified failure.

In one embodiment, multi-label multiclass classifier 305 predicts the issue's attributes/characteristics in connection with the predicted root cause failure. For example, multi-label multiclass classifier 305 is configured to predict the failed component name, the responsible team name, the severity of the issue, the related items, etc. In this manner, the appropriate team or component can be utilized to handle or address the issue.

In one embodiment, multi-label multiclass classifier 305 assigns the appropriate team or component to handle or address the issue based on the predicted root cause failure. In one embodiment, multi-label multiclass classifier 305 utilizes a data structure (e.g., data structure stored in a data storage unit of bug system 102, such as memory 205 or disk unit 208) that associates a predicted root cause failure and the predicted failed component with the severity of the issue as well as the appropriate team or component to be utilized to handle or address the issue.

As discussed above, a multiclass or multinomial classification is the problem of classifying instances into one of three or more classes. In one embodiment, the multiclass classifier identifies three difference classes of failures, such as severity of the issue, failed component name, responsible team name, etc.

In one embodiment, the second machine learning model corresponds to a classification model trained to predict the issue type (e.g., severity of the issue, failed component name, responsible team name, etc.) for the unclassified failures. In one embodiment, such a machine learning model is trained based on the identified root cause failures of the clusters.

Bug system 102 further includes the software component of multi output model 306 for predicting the root cause failure of the unclassified failure using the second machine learning model.

In one embodiment, the second machine learning model is trained on a features vector with target values (vector of failure attributes classified for the cluster). A prediction results value corresponding to each target is then returned by multi output model 306. For example, the prediction of ["severity-1", "payload-logging", "Team Name"] is returned. Targets (labels) may then be read from historical issues (set of historical failures) created in bug system 102.

Bug system 102 additionally includes the software component of correlator 307. Correlator 307 is configured to identify a set of correlations between the root cause of the unclassified failure and the set of historical failures. "Correlation," as used herein, refers to a statistical relationship or statistical association between the root cause of the unclassified failure and the set of historical failures. In one embodiment, the measure of dependence between the root cause of the unclassified failure and the set of historical failures is the Pearson product-moment correlation coefficient. In one embodiment, the coefficient has a value between −1 to 1. A positive correlation occurs when an increase in one variable increases the value in another. A negative correlation occurs when an increase in one variable decreases the value of another. The weakest linear relationship is indicated by a correlation coefficient equal to 0.

In one embodiment, correlator 307 utilizes unsupervised learning techniques, such as a recommendation system and correlation finding, to identify correlations between the root cause of the unclassified failure and already existing issues (set of historical failures). A "recommendation system," as used herein, refers to a subclass of information filtering systems that seek to predict the "rating" or "cause" of a failure. That is, a recommendation system, as used herein, refers to a class of techniques and algorithms which are able to suggest "relevant" causes of failures. In one embodiment, the recommendation system includes both collaborative filtering and content-based systems. In one embodiment, the recommendation system computes a co-occurrence matrix from a history matrix of events and actions (history matrix consisting of the predicted root causes of the unclassified failures and the set of historical failures). Relevant indicators may then be extracted from the co-occurrence matrix thereby creating an item-to-item indicator matrix (item-item model).

In one embodiment, correlator 307 assigns a confidence level to such correlations. In one embodiment, the confidence level is determining by taking half of the size of the confidence interval, multiplying it by the square root of the sample size and then dividing by the same standard deviation. The confidence level may then be identified by looking up the resulting Z or t score in a table.

In one embodiment, labels (root cause) from highly correlated issues can be reused.

Bug system 102 further includes the issue metadata enrichment module 308 configured to label the set of correlations (between the root cause of the unclassified failure and the set of historical failures) according to the set of failure attributes. For example, the set of correlations between the root cause of the unclassified failure and the set of historical failures may include a correlation coefficient of 0.6 for the historical bug failure of functionality, a correlation coefficient of 0.5 for the historical bug failure of communication, a correlation coefficient of 0.4 for the historical bug failure of a missing command, a correlation coefficient of 0.9 for the historical bug failure of a syntactic error, a correlation coefficient of 0.2 for the historical bug failure of error handling, and a correlation coefficient of 0.8 for the historical bug failure of calculation. Such a set of correlations may then be labeled to the appropriate set of failure attributes, such as execution data and time, execution duration, execution log, component name, severity of the issue, etc. In one embodiment, such failure attributes correspond to the recommendations made by multi output model 306 for the predicted root cause of the unclassified failure using the second machine learning model.

In one embodiment, the particular failure attributes that are selected to be labeled to the set of correlations are based on the correlated failures (e.g., bug failures, test failures).

Bug system 102 additionally includes feedback module 309 which is configured to update the first and second machine learning models according to the set of correlations. In one embodiment, feedback module 309 is a continuous learning system whereby the first and second machine learning models continually learn from a stream of data (set of correlations) so as to better differentiate between different types of failures (e.g., bug failure, test failure) and better predict the root cause of an unclassified failure, respectively. The set of correlations is an indication of how closely correlated is the predicted root cause of an unclassified failure to the set of historical failures. The greater the correlation, the better the prediction of the root cause of the unclassified failure (performed by the second machine learning model) and vice-versa. Furthermore, the greater the correlation, the better the labeling of the historical failures (performed by the first machine learning model) and vice-versa. As a result, the greater the correlation, the greater the usage of such data to update the training sets used to train the models and vice-versa.

Additional details regarding the functionality of the software components of FIG. 3 is provided below in connection with FIG. 4.

As discussed above, FIG. 4 is a flowchart of a method 400 for analyzing the test result failures using artificial intelligence models in accordance with an embodiment of the present disclosure.

Referring to FIG. 4, in conjunction with FIGS. 1-3, in step 401, connected failures detector 301 groups a set of test failures within the test results into one or more sets of test failure groups according to a set of failure attributes. As discussed above, in one embodiment, connected failures detector 301 uses one or more unsupervised clustering algorithms to group the set of failures into one or more sets of failure groups. Examples include the K-means clustering algorithm and the Fuzzy c-means clustering algorithm. Furthermore, "the one or more sets of test failures groups," as used herein, are groups of test failures with similar failure attributes. "Failure attributes," as used herein, refer to the attributes or features of test reports and the reported historical issues that are linked to historical test reports. For example, such failure attributes may include the test suite execution summary, test case name, environment name, execution date and time, execution duration, test suite name, test case description, test case order number, test case execution log, test case execution error message and test case execution stack trace. "Reported historical issues," as used herein, refer to the issues reported to bug system 102. Such issues may be linked to a test report. In one embodiment, the reported historical issues along with the corresponding test reports may be stored in database 103 connected to bug system 102.

As discussed above, failure groups correspond to groups of test failures with similar failure attributes. "Similar failure attributes," as used herein, refer to failure attributes that are within a threshold degree of similarity (which may be user-selected). In one embodiment, connected failures detector 301 utilizes natural language processing to determine the failure attribute (e.g., error message, such as file not found, low disk space, out of memory, bad command or file name, can't extend, etc.) discussed in the test results (including the reported historical issues). Similarity is then based on how close the semantic meaning of the failure attributes is in the analyzed test cases/reported historical issues. Those that have a semantic meaning within a threshold degree of similarity are deemed to be similar failure attributes that belong in the same test failure group.

As discussed above, connected failures detector 301 may utilize one or more unsupervised clustering algorithms, such as K-means or Fuzzy c-means clustering algorithms. By employing such algorithms for grouping similar failures, duplicate issues are avoided from being reported.

In one embodiment, weights may be assigned to the most important feature attributes, such as execution error message, stack trace and log content, thereby grouping those failures that match more closely to such failure attributes in comparison to other failure attributes.

In step 402, multiclass detector 302 trains a first machine learning model (artificial intelligence model) to differentiate between a bug failure and a test failure within the set of test failures based on the set of failure attributes and a set of historical failures. In one embodiment, multiclass detector 302 trains the first machine learning model using a training algorithm (e.g., LightGbmMulticlassTrainer, SdcaMaximumEntropyMulticlassTrainer, SdcallonCalibratedMulticlassTrainer, LbfgsMaximumEntropyMulticlassTrainer, NaiveBayesMulticlassTrainer, OneVersusAllTrainer, PairwiseCouplingTrainer and ImageClassificationTrainer).

As used herein, the set of historical failures refers to those failures that were previously identified and grouped by connected failures detector 301. Such historical failures may be stored in database 103.

A machine learning model, as used herein, refers to a mathematical model built by a machine learning algorithm based on sample data, known as "training data," in order to make predictions or decisions without being explicitly programmed to perform the task. In one embodiment, the training data consists of both bug failures and test failures identified based on the set of failure attributes and the set of historical failures. For instance, the historical failures may include both bug and test failures. Furthermore, particular failure attributes, such as an execution error message (e.g., static defect in lines 122-124), may be associated with a bug failure or a test failure. A bug failure, as used herein, refers to a software bug, such as error, flaw or fault in a computer program or system that causes it to produce an incorrect or unexpected result or to be behave in unintended ways. A test failure, as used herein, refers to a test bug, such an error, flaw or fault in the test to be run on the program to verify that the program runs as expected.

In one embodiment, multiclass detector 302 is a multiclass detector that identifies the failure type. A multiclass or multinomial classification is the problem of classifying instances into one of three or more classes.

In one embodiment, the multiclass detector identifies three difference classes of failures, such as software, test and environment. A software failure corresponds to the bug failure discussed above. A test failure is discussed above. An environment corresponds to the support of an application, such as the operating system, the database system, development tools, compiler, etc. An environment failure corresponds to a failure in such an environment, such as a failure in utilizing the development tools.

In one embodiment, the multiclass detector trains the first machine learning model corresponding to a classification model trained to predict the issue type (e.g., bug failure, test failure) for the failed test cases. In one embodiment, such a machine learning model is trained based on test case information, such as test suite execution summary, test case name, environment name, execution data and time, execution duration, test suite name, test case description, test case execution log, test case execution error message and test case execution stack trace.

In one embodiment, particular target information is extracted and labeled from historical issues reported by subject matter experts. In one embodiment, each issue is labeled by adding the appropriate tag value or field value, such as bug, text, and environment, to correspond to a bug, test and environment failure, respectively.

In step 403, issue type predictor 303 determines the failure type (e.g., bug failure, test failure) for each failed test in the one or more sets of test failure groups using the first machine learning model.

In step 404, issue creator 304 clusters the failed tests in the one or more sets of test failure groups into a set of clusters according to the set of failure attributes and the determined failure type for each failed test. In one embodiment, issue creator 404 also clusters the failed tests in the set of historical failures into the set of clusters according to the set of failure attributes.

As discussed above, "clustering," as used herein, refers to a machine learning technique that involves the grouping of data points (e.g., failure type, failure attributes). Given a set of data points, a clustering algorithm is used to classify each data point into a specific group (e.g., set of clusters). In one embodiment, such clustering algorithms include centroid-based clustering, density-based clustering, distribution-based clustering, and hierarchical clustering.

Furthermore, in one embodiment, information enclosed under the issue can be used to determine the failure type for the currently analyzed failed test case.

In step 405, multi-label multiclass classifier 305 identifies, based on the set of clusters and the set of failure attributes, a root cause failure for each cluster. In one embodiment, a root cause analysis is performed to identify the root cause of the failure or problem for each cluster. In one embodiment, the root cause analysis identifies and describes the failure or problem from the set of clusters; establishes a timeline from the normal situation up to the time the failure or problem occurred; distinguishes between the root cause and other causal factor (e.g., using event correlation); and establishes a causal graph between the root cause and the problem. Such a causal graph is then analyzed to determine whether there is an association between the failure attribute (problem) and the root cause. A "root cause failure," as used herein, refers to the initiating cause of either a condition or a causal chain that leads to an outcome or effect of interest. That is, the root cause is a cause (harmful factor) that is root (deep, basic, fundamental, underlying, initial or the like).

In step 406, multi-label multiclass classifier 305 trains a second machine learning model to predict the root cause of an unclassified failure based on identifying a root cause failure for each cluster.

As discussed above, a machine learning model is a mathematical model built by a machine learning algorithm based on sample data, known as "training data," in order to make predictions or decisions without being explicitly programmed to perform the task. In one embodiment, the training data consists of the identified root cause failures for each cluster. Based on identifying the failure attributes classified for the cluster, the machine learning model is able to predict the root cause failure for an unclassified failure based on the failure attributes of the unclassified failure.

As also discussed above, multi-label multiclass classifier 305 predicts the issue's attributes/characteristics, such as predicting the failed component name, the responsible team or component name, the severity of the issue, the related items, etc. In this manner, the appropriate team or component can be utilized to handle or address the issue.

In step 407, multi output model 306 predicts the root cause of the unclassified failure using the second machine learning model. In one embodiment, such a prediction also includes the prediction of the issue's attributes/characteristics from multi-label multiclass classifier 305, such as predicting the failed component name, the responsible team or component name, the severity of the issue, the related items, etc.

In step 408, correlator 307 identifies a set of correlations between the root cause of the unclassified failure and the set of historical failures. As discussed above, "correlation," as used herein, refers to a statistical relationship or statistical association between the root cause of the unclassified failure and the set of historical failures. In one embodiment, the measure of dependence between the root cause of the unclassified failure and the set of historical failures is the Pearson product-moment correlation coefficient. In one embodiment, the coefficient has a value between −1 to 1. A positive correlation occurs when an increase in one variable increases the value in another. A negative correlation occurs when an increase in one variable decreases the value of another. The weakest linear relationship is indicated by a correlation coefficient equal to 0.

In one embodiment, correlator 307 assigns a confidence level to such correlations. In one embodiment, the confidence level is determining by taking half of the size of the confidence interval, multiplying it by the square root of the sample size and then dividing by the same standard deviation. The confidence level may then be identified by looking up the resulting Z or t score in a table.

In step 409, issue metadata enrichment module 308 labels the set of correlations (between the root cause of the unclassified failure and the set of historical failures) according to the set of failure attributes. For example, the set of correlations between the root cause of the unclassified failure and the set of historical failures may include a correlation coefficient of 0.6 for the historical bug failure of functionality, a correlation coefficient of 0.5 for the historical bug failure of communication, a correlation coefficient of 0.4 for the historical bug failure of a missing command, a correlation coefficient of 0.9 for the historical bug failure of a syntactic error, a correlation coefficient of 0.2 for the historical bug failure of error handling, and a correlation coefficient of 0.8 for the historical bug failure of calculation. Such a set of correlations may then be labeled to the appropriate set of failure attributes, such as execution data and time, execution duration, execution log, component name, severity of the issue, etc. In one embodiment, such failure attributes correspond to the recommendations made by multi output model 306 for the predicted root cause of the unclassified failure using the second machine learning model.

In one embodiment, the particular failure attributes that are selected to be labeled to the set of correlations are based on the correlated failures (e.g., bug failures, test failures).

In step 410, feedback module 309 updates the first and second machine learning models according to the set of correlations. As discussed above, in one embodiment, feedback module 309 is a continuous learning system whereby the first and second machine learning models continually learn from a stream of data (set of correlations) so as to better differentiate between different types of failures (e.g., bug failure, test failure) and better predict the root cause of an unclassified failure, respectively. The set of correlations is an indication of how closely correlated is the predicted root cause of an unclassified failure to the set of historical failures. The greater the correlation, the better the prediction of the root cause of the unclassified failure (performed by the second machine learning model) and vice-versa. Furthermore, the greater the correlation, the better the labeling of the historical failures (performed by the first machine learning model) and vice-versa. As a result, the greater the correlation, the greater the usage of such data to update the training sets used to train the models and vice-versa.

As a result of the foregoing, embodiments of the present disclosure provide a means for analyzing failed test cases using artificial intelligence models to determine the cause of such failures and identify the appropriate team or component for solving the problem.

Furthermore, the present disclosure improves the technology or technical field involving software testing. As discussed above, in software testing, test automation is the use of software, such as in a test suite (referred to herein as the "automated test suite"), separate from the software being tested to control the execution of tests and the comparison of actual outcomes with predicted outcomes. Test automation can automate some repetitive but necessary tasks in a formalized testing process already in place, or perform additional testing that would be difficult to do manually. Test automation is critical for continuous delivery and continuous testing. The automated test suite may be executed multiple times, including in different software testing environments. As a result, there may be hundreds of tests with numerous failed test cases to analyze. Typically, the failed test cases are analyzed manually by the software developer to determine the cause of the failure, such as a result of a "bug" in the software (a software bug is an error, flaw or fault in a computer program or system that causes it to produce an incorrect or unexpected result, or to behave in unintended ways), a bug in the test (a test bug is an error, flaw or fault in the test to be run on the program to verify that the program runs as expected) or an environment issue. After analyzing the failed test case, the issue or problem concerning the failed test case is categorized by setting the appropriate severity rating and assigning the failed test case to the appropriate team or component to address or handle. For example, a problem description regarding the failed test case may be written by subject matter experts which is then provided to the appropriate team to address. Such a process in evaluating failed test cases by determining the cause of such failures and identifying the appropriate team or component for solving the problem is very time consuming and overwhelming, even for experienced software engineers.

Embodiments of the present disclosure improve such technology by grouping a set of test failures (within the test results) into one or more sets of test failure groups according to a set of failure attributes. A "failure group," as used herein, refers to a group of failures with similar failure attributes. "Failure attributes," as used herein, refer to the attributes or features of test reports and the reported historical issues that are linked to historical test reports. For example, such failure attributes may include the test suite execution summary, test case name, environment name, execution date and time, execution duration, test suite name, test case description, test case order number, test case execution log, test case execution error message and test case execution stack trace. Furthermore, a first machine learning model (artificial intelligence model) is trained to differentiate between a bug failure and a test failure within the set of test failures based on the set of failure attributes and a set of historical failures. The failure type (e.g., bug failure, test failure) for each failed test in the one or more sets of test failure groups is then determined using the first machine learning model. The failed tests in the one or more sets of test failure groups are then clustered into a set of clusters according to the set of failure attributes and the determined failure type for each failed test. A root cause failure for each cluster is identified based on the set of clusters and the set of failure attributes. A "root cause failure," as used herein, refers to the initiating cause of either a condition or a causal chain that leads to an outcome or effect of interest. That is, the root cause is a cause (harmful factor) that is root (deep, basic, fundamental, underlying, initial or the like). A second machine learning model (artificial intelligence model) is then trained to predict a root cause of an unclassified failure based on identifying the root cause failure for each cluster. The root cause of the unclassified failure is then predicted using the second machine learning model. In this manner, the analysis of failed test cases, including determining the cause of such test failures, may be performed in a more efficient and accurate manner. Additionally, in this manner, there is an improvement in the technical field involving software testing.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for analyzing test result failures using artificial intelligence models, the method comprising:
    grouping a set of test failures within a plurality of test results into one or more sets of test failure groups according to a set of failure attributes;
    training a first machine learning model to differentiate between a bug failure and a test failure within said set of test failures based on said set of failure attributes and a set of historical failures;
    determining a failure type for each failed test in said one or more sets of test failure groups using said first machine learning model;
    clustering said failed tests in said one or more sets of test failure groups into a set of clusters according to said set of failure attributes and said determined failure type for each failed test;
    identifying a root cause failure for each cluster based on said set of clusters and said set of failure attributes;
    training a second machine learning model to predict a root cause of an unclassified failure based on identifying said root cause failure for each cluster; and
    predicting said root cause of said unclassified failure using said second machine learning model.

2. The method as recited in claim 1 further comprising:
    identifying a set of correlations between said root cause of said unclassified failure and said set of historical failures.

3. The method as recited in claim 2 further comprising:
    labeling said set of correlations according to said set of failure attributes.

4. The method as recited in claim 3 further comprising:
    updating said first and second machine learning models according to said set of correlations.

5. The method as recited in claim 1 further comprising:
    clustering said failed tests in said one or more sets of test failure groups into said set of clusters according to said set of failure attributes and said determined failure type for each failed test as well as clustering failed tests in said set of historical failures into said set of clusters according to said set of failure attributes.

6. The method as recited in claim 1, wherein said grouping is performed by one or more unsupervised clustering algorithms.

7. The method as recited in claim 6, wherein said one or more unsupervised clustering algorithms use K-means or Fuzzy c-means clustering.

8. A computer program product for analyzing test result failures using artificial intelligence models, the computer program product comprising one or more computer readable storage mediums having program code embodied therewith, the program code comprising the programming instructions for:
    grouping a set of test failures within a plurality of test results into one or more sets of test failure groups according to a set of failure attributes;
    training a first machine learning model to differentiate between a bug failure and a test failure within said set of test failures based on said set of failure attributes and a set of historical failures;
    determining a failure type for each failed test in said one or more sets of test failure groups using said first machine learning model;
    clustering said failed tests in said one or more sets of test failure groups into a set of clusters according to said set of failure attributes and said determined failure type for each failed test;
    identifying a root cause failure for each cluster based on said set of clusters and said set of failure attributes;
    training a second machine learning model to predict a root cause of an unclassified failure based on identifying said root cause failure for each cluster; and
    predicting said root cause of said unclassified failure using said second machine learning model.

9. The computer program product as recited in claim 8, wherein the program code further comprises the programming instructions for:
    identifying a set of correlations between said root cause of said unclassified failure and said set of historical failures.

10. The computer program product as recited in claim 9, wherein the program code further comprises the programming instructions for:
    labeling said set of correlations according to said set of failure attributes.

11. The computer program product as recited in claim 10, wherein the program code further comprises the programming instructions for:
    updating said first and second machine learning models according to said set of correlations.

12. The computer program product as recited in claim 8, wherein the program code further comprises the programming instructions for:
    clustering said failed tests in said one or more sets of test failure groups into said set of clusters according to said set of failure attributes and said determined failure type for each failed test as well as clustering failed tests in said set of historical failures into said set of clusters according to said set of failure attributes.

13. The computer program product as recited in claim 8, wherein said grouping is performed by one or more unsupervised clustering algorithms.

14. The computer program product as recited in claim 13, wherein said one or more unsupervised clustering algorithms use K-means or Fuzzy c-means clustering.

15. A system, comprising:
    a memory for storing a computer program for analyzing test result failures using artificial intelligence models; and
    a processor connected to said memory, wherein said processor is configured to execute the program instructions of the computer program comprising:
        grouping a set of test failures within a plurality of test results into one or more sets of test failure groups according to a set of failure attributes;
        training a first machine learning model to differentiate between a bug failure and a test failure within said set of test failures based on said set of failure attributes and a set of historical failures;
        determining a failure type for each failed test in said one or more sets of test failure groups using said first machine learning model;

clustering said failed tests in said one or more sets of test failure groups into a set of clusters according to said set of failure attributes and said determined failure type for each failed test;

identifying a root cause failure for each cluster based on said set of clusters and said set of failure attributes;

training a second machine learning model to predict a root cause of an unclassified failure based on identifying said root cause failure for each cluster; and predicting said root cause of said unclassified failure using said second machine learning model.

16. The system as recited in claim 15, wherein the program instructions of the computer program further comprise:

identifying a set of correlations between said root cause of said unclassified failure and said set of historical failures.

17. The system as recited in claim 16, wherein the program instructions of the computer program further comprise:

labeling said set of correlations according to said set of failure attributes.

18. The system as recited in claim 17, wherein the program instructions of the computer program further comprise:

updating said first and second machine learning models according to said set of correlations.

19. The system as recited in claim 15, wherein the program instructions of the computer program further comprise:

clustering said failed tests in said one or more sets of test failure groups into said set of clusters according to said set of failure attributes and said determined failure type for each failed test as well as clustering failed tests in said set of historical failures into said set of clusters according to said set of failure attributes.

20. The system as recited in claim 15, wherein said grouping is performed by one or more unsupervised clustering algorithms.

* * * * *